INVENTOR.
ARTHUR F. SMITH
BY
ATTORNEY

United States Patent Office 2,946,606
Patented July 26, 1960

2,946,606

SEALING CONSTRUCTION

Arthur F. Smith, 1516 Lake Road, Webster, N.Y.

Filed Apr. 19, 1957, Ser. No. 653,816

1 Claim. (Cl. 285—332.3)

This invention relates to a sealing construction and more particularly to a sealing construction for a joint having interfitting coupling members composed of non-deformable material.

In many applications today, it is necessary to couple parts together in sealing engagement as in the case of tubular joints, stoppers, stopcocks, and the like. The coupled parts as well as the associated apparatus are often formed of a non-deformable material such as plastic, glass, metal and the like, in accordance to the particular use to which the apparatus is applied. Glass is a material used extensively today in various apparatus particularly where chemicals and other corrosive materials are processed and handled as a result of its well known thermal, chemical, electrical properties and mechanical strength, and leakproof joints, connections and the like are often required for use in such glass apparatus.

Due to the inherent problem of obtaining precise glass surfaces, sealing is quite difficult between interfitting parts and additional expedients must be employed to increase the sealing action. One of such expedients is the grinding of the cooperating surfaces to improve the sealing characteristics of a joint. As is well known, the grinding of glass surfaces produces an irregular or rough surface containing minute "hills and valleys" which when united with a similarly ground surface produces a noticeable increase in the sealing action. It has been found, however, that regardless of the preciseness with which the cooperating surfaces on interfitting glass parts are formed and ground, an absolute seal or at least one where the leakage is negligible has not been obtained. This leakage, however minor, becomes excessive when the parts are used on apparatus employed in high vacuum applications where the sealing defects are greatly magnified.

Accordingly, a primary object of this invention is to provide a new and novel sealing construction for interfitting parts composed of non-deformable material which is suitable for high vacuum applications.

Another object of this invention is to provide a new and novel sealing construction for a joint composed of glass or similar material.

Still another object of this invention is to provide a new and improved sealing construction for cooperating surfaces on interfitting glass members which virtually eliminate all leakage between the surfaces during the application of a high vacuum.

A still further object of this invention is to provide a new and novel sealing construction for cooperating surfaces of non-deformable material such as glass which is simple in construction, inexpensive, and which may be easily applied to any type of interfitting parts.

This invention further contemplates the provision of a new and novel sealing construction for high vacuum applications which is particularly useful on tubular joints, stopcocks, burettes, and the like composed of glass.

Other objects and advantages of this invention will be particularly set forth in the claim and will be apparent from the following description, when taken in connection with the accompanying drawings, in which:

Figure 1:
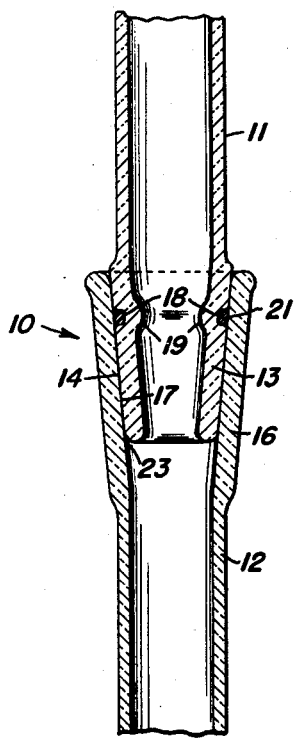
Fig. 1 is a sectional view of a joint for connecting tubing incorporating the invention.

As specifically illustrative of the practice of the invention, there is shown in Fig. 1 a joint designated generally by the numeral 10, to which the invention is applied. The joint 10 comprises a pair of interfitting tubular members 11, 12 which are composed of a non-deformable material and in the illustrated embodiment glass is the material preferably used. The coupling members 11, 12 may be the ends of tubing which are to be joined but in practice are preferably formed as relatively short, tubular members which may be suitably joined at their ends opposite from the joint by means such as fusing to associated tubing.

Figure 2:
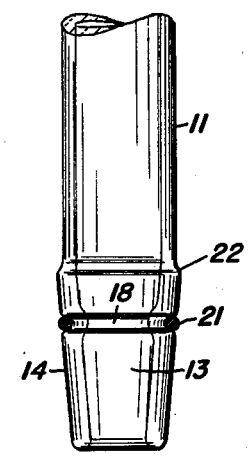
Fig. 2 is a view of one of the coupling members in the joint of Fig. 1.

Referring now to Fig. 2, the coupling member 11 which will be called the "inner" member hereinafter, is tooled at one end to provide an inwardly tapered portion 13 having an outer sealing surface 14. The coupling member 12 which hereinafter will be called the "outer" member is provided with an outwardly tapered portion 16 having an inner surface 17 arranged to cooperate with the surface 14 on the "inner" member 11.

As shown in Fig. 1, the joint 10 is formed by inserting portion 13 on the "inner" member 11 within the portion 16 on the "outer" member 12 and moving these portions into tight fitting relationship as permitted by the tapered surfaces 14, 17. It should be understood, however, that although a tapered fit is shown in the preferred embodiment of Figs. 1, 2, a cylindrical fit could be used within the scope of this invention to achieve the same result.

As previously explained, it is very difficult to obtain precisely tooled surfaces 14, 17 on portions 13, 16 respectively to give the sealing action desired for many applications and therefore, where the material employed in the members 11, 12 is glass, the surfaces 14, 17 may be ground so as to increase the sealing engagement between the surfaces and reduce the leakage. As previously explained, the grinding produces an irregular finish on the cooperating surfaces to provide a certain amount of "intermeshing" which as far as is known contributes substantially to the sealing effect obtained.

It should be understood, however, that although grinding of the surfaces 14, 17 is preferred in the illustrated embodiment, this invention may be practiced with excellent results without the use of ground surfaces.

When tubular members, such as members 11, 12, are coupled as described above, the sealing action at the joint 10 is excellent for most purposes and no leakage, or at least negligible leakage occurs. However, it has been found in applications where a high vacuum is applied to the apparatus with which the joint is associated, that the sealing action at the joint 10 is not sufficiently effective to prevent an undesirable amount of leakage. This inability of the joint 10 to maintain the vacuum will of course create a problem. Means have therefore been provided to increase the sealing action of the joint for high vacuum application.

As specifically illustrative of the construction of the invention, a peripheral groove 18 is provided within the outer surface 14 of portion 13. This groove 18 is preferably formed by deforming or tooling the glass while it is in a plastic state and an inner flange 19 is thereby formed as a result of the inward displacement of the glass.

In order to obtain the high degree of sealing, characteristic of this invention, a sealing member in the form of an O ring 21, composed of resilient material such as neoprene rubber or the like, is disposed within the groove 18. The ring 21 is of such elasticity that it may be slightly deformed so as to be slipped over the end of the "inner" member 11 and seated within the groove 18. Furthermore, the cross sectional area of the O ring 21 is such that its outer marginal edge protrudes slightly outward from the surface 14. In this manner when the "outer" member 12 is coupled to the "inner" member 11, the surface 17 slightly deforms the O ring, causing it to completely fill the groove 18 and effecting an extremely tight seal between the cooperating surfaces 14, 17. Thus, even though severe strain may be placed on the sealing characteristics of the joint 10 of Figs. 1, 2, such as that encountered during high-vacuum application, virtually all leakage is prevented or at least leakage, if any, is negligible due to the highly effective sealing action of the O ring 21.

It should be understood that although the O ring 21 is shown positioned on the "inner" member 11 in the embodiment of Figs. 1, 2, the scope of this invention includes the alternative arrangement by which the O ring is mounted within an annular groove provided in the surface 17 of the "outer" member 12. This would provide substantially the same sealing action as that of the embodiment shown in Figs. 1, 2.

It will be noted that in the embodiment of Figs. 1, 2, the O ring 21 and groove 18 are located adjacent the outer end 22 of portion 13. It has been found that when corrosive materials are carried through the joint, a substantial distance between the entrance 23 to the surfaces 14, 17 (Fig. 1) and the O ring 21 provides a path of sufficient length to reduce the possibility of a corrosive attack on the O ring.

Figure 3:
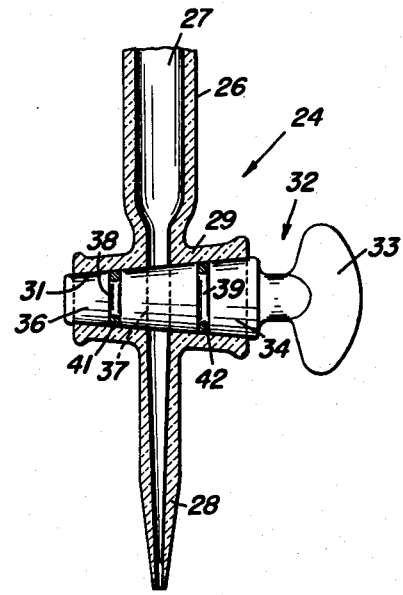
Fig. 3 is a partial, sectional view of a burette which incorporates a modification of the invention.

Referring now to Fig. 3, the sealing construction of the invention lends itself readily to many types of joints particularly where the joint is composed of glass and in Fig. 3, the invention has been adapted for use on a burette, generally designated by the numeral 24. The burette 24 is of the conventional type having a tubular body portion 26 (broken away), an inner bore 27, a nozzle 28, and a barrel containing a tapered inner wall 31.

A valve or key, designated generally by the numeral 32, is disposed within the barrel 29. The key 32 contains an operating knob 33 and a tapered body portion 34 having an outer surface 36 cooperating with the inner surface 31 of the barrel 29. The key body 34 is also provided with a transverse passage 37 which communicates with the burette bore 27 in one position of rotation of the key to permit the passage of liquid therethrough for subsequent discharge through the nozzle 28. It will be understood that even though the cooperating surfaces 31, 36 of the barrel 29 and key body 34 respectively may be ground to increase the sealing relationship, some leakage will occur between the surfaces in high vacuum application.

In accordance with the novel construction of the invention, a pair of peripheral grooves 38, 39, have been provided in the key body 34 on either side of the passage 37, as shown in Fig. 3. O rings 41, 42, are positioned in these grooves as in the embodiment of Figs. 1, 2, and the sealing between the surfaces 31, 36 is intensified so that virtually no leakage or at least a negligible amount of leakage occurs through the open ends of the barrel during the application of a high vacuum.

Figure 4:
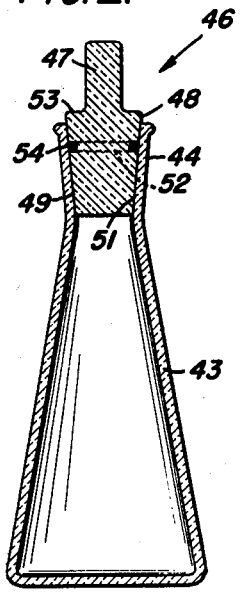
Fig. 4 is a sectional view showing the invention applied to the stopper of a flask.
Figure 5:
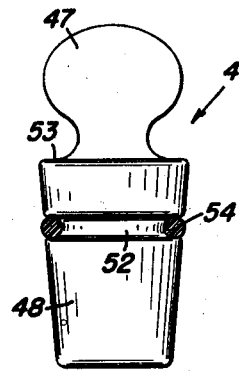
Fig. 5 is an enlarged view of the stopper of Fig. 4.

There is shown in Figs. 4, 5, another application for the sealing construction of the invention which comprises a flask 43, preferably composed of glass. The flask 43 is provided with a mouth 44 which is preferably tapered, as shown, in an upwardly flaring direction. In order to effect a closing of the flask mouth 44, a closure or glass stopper, designated generally by the numeral 46, is provided which contains an operating knob 47 and a tapered body portion 48 having an outer surface 49.

The flask mouth 44 contains an inner wall or surface 51. The stopper surface 49 cooperates with the inner surface 51 of the flask mouth when the stopper is in the closing position of Fig. 1 to effect a sealing engagement and the surfaces may be ground in the conventional manner to improve the sealing action.

As shown best in Fig. 5, a peripheral groove 52 has been provided in the stopper body 48 preferably adjacent the stopper upper edge 53 in which is disposed an O ring 54 which operates in the manner described above to produce the desired sealing action required in high vacuum applications.

Figure 6:
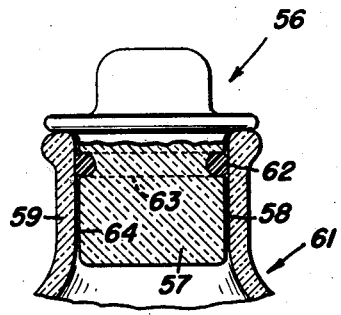
Fig. 6 is a fragmentary view, partially in section, of a modification of the flask and stopper of Fig. 4.

It should be understood that although a taper is preferred in the stopper embodiment of Figs. 4, 5, a construction such as that shown in Fig. 6 may be employed within the scope of the invention. Fig. 6 shows a stopper 56 having a body portion 57 substantially cylindrical in cross section. The stopper 56 is positioned within the vertically extending mouth 59 of a container 61. In the manner of the invention, an O ring 62 is positioned within a groove 63 in the stopper body 57 so as to cooperate with the inner wall 64 of mouth 59 and improve the sealing characteristics of the stopper.

While there has been shown and described the preferred forms of mechanisms of the invention, it will be apparent that various changes and modifications may be made therein, particularly in the form and relation of parts, without departing from the spirit of the invention as set forth in the appended claim.

I claim:

A convertible high vacuum-low vacuum sealing construction for a ground glass joint between two cylindrical, coaxial glass conduits, that have respectively relatively movable male and female members that are formed with complementary-shaped, mating, ground generally conical surfaces that are engageable substantially throughout their entire lengths to form a substantially fluid tight seal between the engaged mating portions thereof, said ground mating portions engaging frictionally to resist displacement relative to each other in all directions, said male member having intermediate the lengthwise ends of its said ground, conical surface an endless groove that has a generally circular section in a plane at a right angle to the axis of said surface and that is coaxial with said conduits, and an endless fluid seal element formed of resilient rubber-like material and generally round in cross-section disposed in said groove to engage the surface of said groove and to project from said groove so that when said mating surfaces are engaged, said element is subject to compressive stresses which make it conform with and resiliently engage said ground, conical surface of the female member and the surface of said groove, thereby to form a more perfect fluid-tight seal between the engaged mating portions of said surfaces, and frictionally to resist displacement of said two parts relative to each other in all directions, said construction being useable in the absence of said seal element as a ground glass joint.

References Cited in the file of this patent

UNITED STATES PATENTS

| | | |
|---|---|---|
| 228,696 | Thompson | June 8, 1880 |
| 259,065 | Wetherbee | June 6, 1882 |
| 458,636 | Meilink et al. | Sept. 1, 1891 |
| 2,083,228 | Geyer | June 8, 1937 |
| 2,092,243 | Breese | Sept. 7, 1937 |
| 2,154,574 | Martin | Apr. 18, 1939 |
| 2,453,813 | Prince | Nov. 16, 1948 |
| 2,708,096 | Mueller | May 10, 1955 |
| 2,796,887 | Stern | June 25, 1957 |

FOREIGN PATENTS

| | | |
|---|---|---|
| 2,627 | Great Britain | Feb. 26, 1885 |
| 610,298 | France | June 2, 1926 |
| 704,944 | Great Britain | Mar. 3, 1954 |